United States Patent Office 3,284,181
Patented Nov. 8, 1966

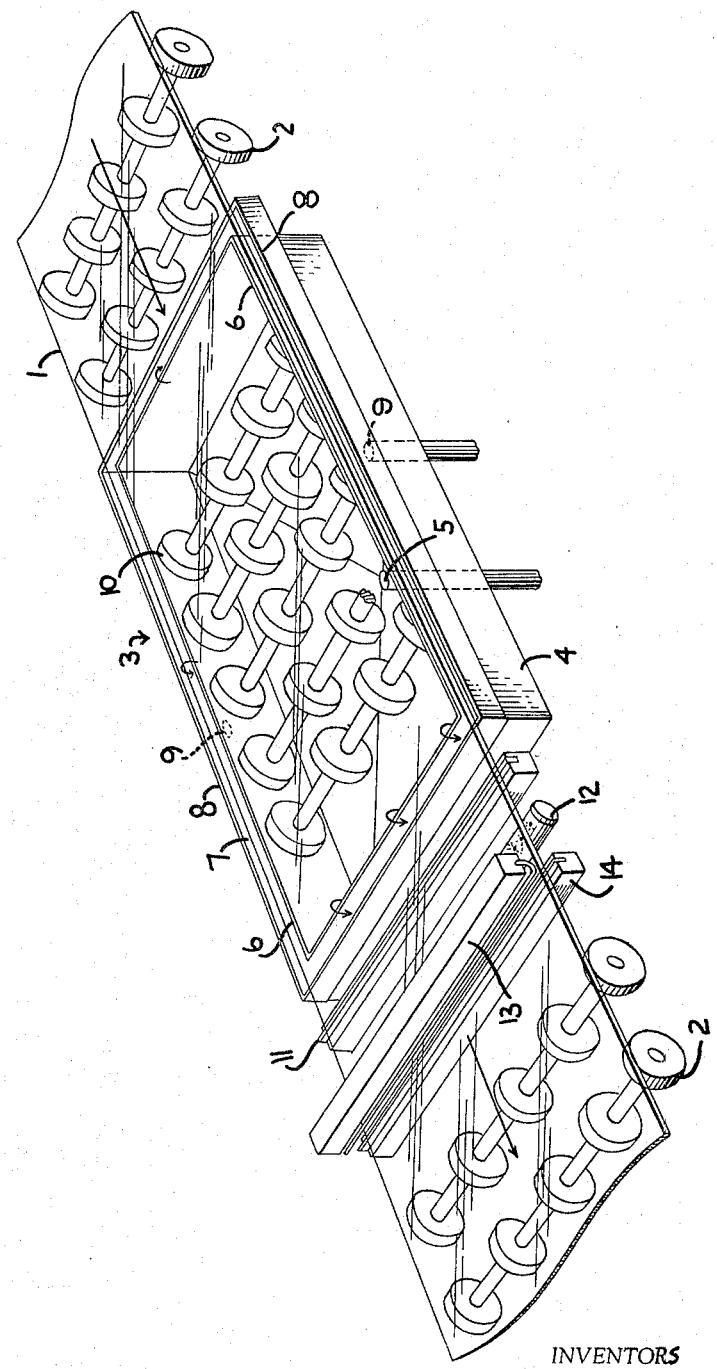

3,284,181
PROCESS FOR FINISHING FLOAT GLASS
William C. Harrell, Arnold, and Henry M. Demarest, Jr., Natrona Heights, Pa., assignors to Pittsburgh Plate Glass Company, Pittsburgh, Pa., a corporation of Pennsylvania
Filed July 29, 1964, Ser. No. 385,874
5 Claims. (Cl. 65—31)

This application is a continuation-in-part of our copending applications, Serial No. 253,412, filed January 23, 1963, entitled "Process for Finishing Float Glass," and Serial No. 282,970, filed May 24, 1963, entitled "Process for Finishing Glass," both abandoned, and all of the disclosure of each of the foregoing applications as relied upon in the application and incorporated herein by reference.

This invention relates to the finishing of float glass and its treatment to make it competitively suitable for further processing or use; for example, in bending or abrasive polishing.

It is known that glass suitable for commercial use can be produced by forming a ribbon of molten glass on a bath of a more dense molten liquid such as molten tin or other molten metal which is inert to glass. A typical embodiment of this process is described in United States Patent No. 2,911,759, granted November 10, 1959, to Pilkington et al. The tin may contain other components such as alkali metals, which serve to improve the process of forming or casting the ribbon. This glass is termed "float glass," an expression which has become recognized in the glass industry as being definitive of glass produced by the above-described methods.

Glass so produced exhibits an optical deficiency. For example, when examined, especially after being subjected to heat, the surface thereof that was in contact with the molten metal during its formation exhibits iridescence or light interference patterns which produce colors on the under side or float surface thereof. This deficiency shows up more markedly when the glass is processed in subsequent operations. For example, when float glass is heated, or heated and bent, it loses transparency in the area of heat treatment or the bend, and the float surface of the glass sheet which had been in contact with a molten metal support during manufacture becoming so iridescent as to materially obscure vision. It is possible to avoid the iridescent appearing surface by dissolving at least a portion of the layer of the glass which has contacted the liquid bath during the formation thereof. The above described deficiency cannot be readily overcome by the customary methods of glass finishing used heretofore, because attempts to finish polish the float surface of unheated and unbent float glass under polishing blocks with fine abrasives is more difficult to accomplish without the introduction of polishing block defects and employment of very high block pressures as compared with polishing of the other side of the same glass sheet.

According to this invention methods have been provided for eliminating or minimizing these defects or deficiencies in float glass in a simple manner.

Briefly, in accordance with our invention, we have solved the problem by dissolving the incipient defect layer of the glass which has been in contact with the liquid of the bath after the glass ribbon or sheet has been formed and cooled, preferably before the glass is heated, bent, abrasive polished or otherwise processed. The invention is explained in detail, and its further objects and advantages are apparent in the following description taken in connection with the accompanying drawing showing a perspective view of a section of a float glass manufacturing line for practicing the process of the invention.

As pointed out in the above-identified patent, a flat glass ribbon is supported during part of its travel to the end of the production line on a molten metal bath. The molten metal is typically tin or a tin alloy; one of the reasons for selecting tin being that it does not react with the glass to any great extent. Other metals or metal alloys employed in this art which satisfy the foregoing requirements may be used in lieu of tin and tin alloys. The float glass itself is of the general lime-soda-sand composition long used in the economic manufacture of plate glass in the United States and abroad. This class of glass composition may contain, approximately by weight, 20 percent sodium oxide, 5 percent calcium oxide, 70–75 percent silica and small amounts of other components.

From our observations we have concluded that the float surface of the glass does in fact often incorporate tin or tin oxide from the molten metal support bath. Metals or metal alloys used in lieu of tin as the supporting metal may likewise become incorporated in the float surface. While this condition is desirably to be minimized by control of temperatures, it is difficult to detect and difficult to avoid until after a large amount of glass has been produced. In short, the glass as produced may have no readily apparent iridescent surface defect until after heating or bending or further processing. That is, while the defect may initially be incipient, it develops markedly on heating, bending or like treatment. The iridescent surface defect condition always appears on the float surface of heated or heated and bent glass, whether that be on the inside or the outside of the bend. When this defect has been detected it has been determined that the float surface of the glass is not of the same softness as the remainder of the glass thickness or that it softens at a higher temperature. By microscopic examination it has been noted that the iridescent layer when on the outside of the bend appeared to have fissured or parted in tension at intervals and when on the inside of the bend appeared to have corrugated or folded under compression. Since an incipient defect bearing portion of the float surface of such glass, while still flat, is removed with more difficulty by abrasive polishing than is a similar thickness or portion of glass from the fire polished opposite side of the same sheet, it is likely that the float surface has a significantly different composition. Chemical analysis reveals the presence of tin or tin compounds in the float surface and that the tin concentration decreases rapidly with depth. This would correspond to free diffusion of tin oxide from the float bath surface into the glass. In any event, while the exact chemical and physical structure of the float surface is not fully known, the outer layer or skin of the float side of the glass has been found to possess all the characteristics of a glass of different composition.

In accordance with our invention, we have found that removal of the surface or skin which exhibits this iridescence in float glass may be achieved by controlled treatment with an aqueous acid solution of a fluorine containing compound which, in an aqueous solution thereof, provides fluorine ions and dissolves glass. This invention is carried out with other fluorine-containing compounds which may be used in aqueous solutions in lieu of hydrogen fluoride, for example, the bifluorides of alkali metals and ammonium bifluoride, preferably, dilute aqueous solutions of hydrofluoric acid, or of a mixture of dilute hydrofluoric acid and fluorosilicic acid. Aqueous solutions containing from 1 to 30 percent, by weight, of hydrogen fluoride may be employed in this invention. It is preferred, however, to employ an aqueous solution of hydrogen fluoride containing from about 5 to about 15 percent, by weight, hydrogen fluoride. It is rarely necessary to employ hydrofluoric acid of a concentration of hyrogen fluoride in excess of about 20 percent, by weight, though, in use, it may reach 50 percent. It has also been found eminently suitable for attacking and dissolving the float surface and, with minimum cost, control problems and safety hazards to include from about 1 to about 25 percent, by weight, of fluorosilicic acid, and rarely up to 30 percent by weight thereof. Regardless of the difficulties in significantly relating the thickness and composition of the float surface, we have found that the elimination of the undesired after effects from heating, or heating and bending of float glass by finish polishing can be satisfactorily and economically avoided in most instances with this invention by glass removal to a depth below about 5 microns, usually on the order of about 1 to about 2 microns, and, preferably about one micron or less, (one micron being one millionth of a meter or approximately 40 millionths of an inch or 40 microinches) from the float side of the flat glass. With the removal limited to such a small amount, the process can be economically and quickly performed on the glass production line. The acid treatment need not be limited to the float glass surfaces to be bent, nor does the acid cost make a localized removal uneconomical in view of the overall small removal from the glass surface. It is important, however, to carry out this invention with float glass before it is treated in a manner such that the defect in the float surface produces iridescent color. Thus, it has been found that, if the invention is employed after iridescence is produced, the removal of glass from the defective colored surface to a depth far in excess of about 5 microns is required and this is not economical.

In carrying out this invention, for example, with lime-soda-sand float glass samples of nominal quarter inch thickness to be bent on a six inch radius removal of 40 to 50 millionths of an inch (1–1.25 microns) of the float surface removal has been found sufficient to assure freedom from the iridescence defect upon bending. This removal from the samples was provided by immersing the float surface of the glass in about a 10 percent hydrofluoric acid solution (an aqueous solution of anhydrous HF containing about 90 percent, by weight HF) for about 20 seconds. Under plant working conditions, it was found that, with a glass sheet or ribbon moving at a 200 inch per minute line speed, a bath of 65 inches length stationed under the float glass line was sufficient to treat the float glass surface suspended in it. Rolls behind, in, and beyond the bath supported the glass, and a squeegee followed by water washing removed the hydrofluoric acid tending to cling to or wet the under surface of the glass after it passed the tank. No scrubbing, abrading, or other form of working of the glass in the presence of the acid was required.

For the prevention of iridescence in float glass subjected to a twelve inch minimum radius bend, the removal of glass required from the float surface prior to bending has been found sufficient in the 20 to 30 millionths of an inch (.5 to .75 micron) range. This removal requirement was provided by immersing the float surface of the glass in a 5 percent hydrofluoric acid solution for 20 seconds. It was also provided by immersing the float surface of the glass in a 10 percent hydrofluoric acid solution for approximately 10 seconds. Temperature adjustments when the said supply is already formulated is particularly convenient for on-line removal changes, and is one means for controlling the amount of glass removed.

The average removal of glass from the float surface of a ribbon of glass may be determined from the weight loss of a glass sheet of known area. More precise measurements may be made by masking a small area of the surface prior to immersion in the aqueous HF solution, preferably adjacent the side edge of the glass, so that its subsequent elevation above the surrounding surface can be measured. Still another test consists of periodic chemical testing of the float surface.

The removal of glass from the float surface is easily controlled since, in the limited range of glass removal required for the purposes of this invention, the removal of glass is, for practical purposes, a linear function of any one of the factors (1) time of immersion of the glass in the aqueous acid solution, (2) temperature of the aqueous acid solution, and (3) concentration of the hydrogen fluoride, and, if present, of the fluorosilicic acid. Any one of these factors may be employed to control the glass removal. Alternatively, any two or all three of these factors may be used together to control the glass removal from the float surface.

As may be seen from the foregoing, the immersing times and the acid concentrations are small and within conveniently available control. It should be also further appreciated that the concentration range of hydrofluoric acid here involved is not likely to differentially etch the glass surfaces. In the circumstances described, and with a clean, fire polished upper surface of float glass, the entire sheet or ribbon may be immersed without likelihood of ill effects. However, if certain types of defects are present on the fire polished upper surface they may be widened by the acid treatment. For this reason, and as a matter of conserving the hydrofluoric acid, only the lower float side of the glass is preferably suspended, immersed, or otherwise bathed in the dilute hydrofluoric solution.

Further, the removal should not be allowed to proceed too deeply since in that event the treatment tends to widen existing defects therein, such as pits, etc. Thus the fluoride treatment should be discontinued and the fluoride removed before removal of glass to a depth of about 5 microns from the float surface has been exceeded.

Under process conditions described, the presence of support rolls in the acid tank presents no serious problem. Rubber rolls, for example, are neither subject to serious chemical attack by the solutions employed in this invention nor do they result in any objectionable "printing" or acid stains where they contact the lower glass surface in the presence of the acid.

It is important that the process be conducted in a way such that deep penetration of the glass surface is avoided. Otherwise, the surface will be impaired. We have found, however, that if the treatment is terminated before more than about 120 millionths of an inch (3 microns) have been removed, there is no serious non-uniformity in the action of the solution upon different parts of the glass surface and, thus, no serious surface impairment takes place. The surface treatment, in any case, should be interrupted before the transparency of the glass is impaired.

The rate of attack of the glass by the solution varies with temperature of solution; the higher the temperature, the more rapid the attack. Moreover, when using a mixture of hydrofluoric acid and fluorosilicic acid for a constant hydrofluoric acid concentration, the rate of removal of glass increases with increase in the amount of fluorosilicic acid present.

A preferred embodiment of this invention is demonstrated by a series of runs in which the bottom (liquid-metal-contacted) surface of each of a plurality of 2-inch square samples of float glass was contacted with solutions for a 20-second period at the temperatures indicated below, and then the samples were immediately washed and the amount of glass removed from each sample was determined. The results were as follows:

| Composition of Solution (percent by weight) | | Temperature of Solution (degrees Fahrenheit) | Removal of glass (millionths of an inch) |
|---|---|---|---|
| Hydrofluoric Acid | Fluorosilicic Acid | | |
| 10 | 0 | 70 | 38 |
| 10 | 5 | 70 | 42 |
| 10 | 10 | 70 | 43 |
| 10 | 20 | 70 | 49 |
| 10 | 25 | 70 | 54 |
| 10 | 0 | 120 | 103 |
| 10 | 5 | 120 | 106 |
| 10 | 10 | 120 | 106 |
| 10 | 20 | 120 | 118 |

The above table typically illustrates how variations in the rate of removal can take place with variations in conditions of control. As will be described in greater degree below, it is preferred to subject a continuous moving ribbon to the treatment herein contemplated. To ensure consistent results from hour-to-hour and day-to-day in such a process, it is advantageous to avoid substantial variation in the composition of the solution applied to the glass; thereby to avoid substantial variation in the depth of penetration of the solution.

As a general rule, when using a mixture of hydrofluoric acid and fluorosilicic acid, where the hydrofluoric acid concentration is constant, one percent by weight increase in the concentration of fluorosilicic acid increases the rate of glass removal by 2 percent and vice versa. To ensure uniform results, the concentration of fluorosilicic acid and hydrofluoric acid should not change more than 15 percent by weight, preferably not over 10 percent, and most advantageously less than 5 percent by weight based upon the weight of the solution during the period of use thereof. In general, the sum of the concentrations of these two acids should not exceed 50 percent by weight based upon the weight of solution. For most purposes a solution containing 1 to 30 percent by weight of fluorosilicic acid is satisfactory. The hydrofluoric concentration rarely should exceed 30 percent by weight, usually being in the range of 5 to 15 percent by weight. Adjustment of the acid concentration is made by continuously adding a fresh supply of hydrofluoric acid solution and continuously removing the used slurry of hydrofluoric and fluorosilicic acids. Uniform removal is thus insured when the concentration is maintained uniform.

Small amounts of dissolved tin in the range of from 0.05 percent to below 5.0 percent may be present in the aqueous acid solutions containing a fluorine ion, but this does not reduce the effectiveness of these solutions.

The amount of glass removed may be readily determined by the following test. A patch of a tape, such as lead or a plastic immune to the solution, is adhered to the glass prior to treatment and, in the case of a continuously moving ribbon, to the moving ribbon. The patch protects the covered glass from the solution, so that the area protected remains unchanged. After treatment, the patch is removed and a stylus instrument is used to measure the difference in elevation between the treated glass and that area protected by the tape and produces a trace of the surface contour. The difference is the amount removed. An instrument of this nature commercially available is accurate to within plus or minus two (2) microinches.

One apparatus for the practice of a process in a float glass production line is illustrated in the drawing in which the glass sheet 1 shown as moving in the arrow direction over conventional conveyor rolls 2 represents a portion of a continuous cooled and washed float glass ribbon from the float tank. The float glass side is, of course, the under side. A tank assembly 3 positioned under the ribbon is the float surface finishing station. The tank itself is a basin 4 having a suitably lower end opening 5 to which the dilute acid is continuously fed. The tank has an inner rim 6 which may be either as wide as or wider than the ribbon to be treated. In the embodiment shown in the drawing the upper surface of the glass is protected from acid splash by the glass ribbon overhang beyond the sides of the tank. The length of the inner rim is as long as required for a given glass treatment time at the prevailing line speed. The solution overflows the tank and forces its way between the tank and the glass into a gutter 7 between the inner rim 6 and a spaced outer rim 8. Under these conditions the entire under side of the glass over the tank remains in contact with the liquid.

The solution is returned to a feed supply tank (not shown) for makeup and recirculation, drain outlets 9 in the gutters 7 being provided for this purpose. Support rolls 10 are transversely positioned in the tank to prevent the glass from sagging or scraping the tank rims. Preferably, the rolls 10 are vertically adjustable relative to the tank so as to remove the weight of the glass from the tank rims or provide a small spacing between the glass and inner rim. In any event, the feed supply rate should be sufficient to keep the tank full with liquid bearing against all of the glass above the tank.

The solution is removed from the glass after it has passed beyond the tank. Toward this end a lower squeegee 11 and a perforated water spray pipe 12 are positioned under the glass at the exit end of the tank. A final upper and lower pair of squeegees 13 and 14 wipe the wash water from the glass.

In such a production installation the acid treatment of the float surface may be economically continuously maintained whether or not a float skin is being formed on the glass at any particular time. The tank can be drained easily enough during intervals when no skin removal is desired or the solution concentration can be varied as previously explained to provide the removal necessary under particular conditions.

We have found that any finish polishing of the float surface side of float glass is much more easily accomplished after the float skin has been removed by the acid treatment step previously described. A much shorter polishing line in terms of the number of runner stages is required as compared to that required for finishing the same but untreated glass to the same degree of polish. When the float skin has not been first removed, we have also found that very high runner pressures are required with runner felts and a slurry of finely-divided abrasive particles, such as rouge, to work the glass, and excessive streaking or sleeking of the untreated float surface of the glass has occurred in any useful pressure range.

While various degrees of polishing or none at all may be required, depending upon the use requirements, the successful completion of the polishing removal undertaken is more assured after the preliminary step of acid treating the glass. No other chemical cleaning has been found necessary and, as for bending, the chemical removal or dissolving of the order of 1 micron or less from the float surface is satisfactory whether or not the polished glass is to be bent.

It will be appreciated that the hydrofluoric acid solution may be formulated in various manners, the primary requisite being the presence in solution of hydrogen and fluoride ions corresponding to those found in aqueous hydrofluoric acid. It will be appreciated that the hydrogen ions can be provided by various acids, and that the fluoride ions may be provided by dissolving various fluorides, in the solution. Bifluorides or hydrogen fluorides, such as ammonium bifluoride or the bifluorides of sodium, potassium or other alkali metal may also be employed in lieu of hydrofluoric acid in the process described.

Thus, in general, such fluoride solution should be acidic, i.e., have a pH less than 7.

Employing an economic maximum glass skin removal as the criterion, it will be appreciated that high HF concentrations or high temperatures can be employed if particular precautions are taken to shorten the time of application in view of the rapid removal rate. Conversely, either low HF concentrations, or low temperatures may be employed with longer immersion times. It is clear that any one or any combination of these factors may be varied by the skilled person in this art to whom this disclosure is addressed to control the removal of glass from the float surface. Spray application of the acid solution to the under side of a short length of the glass may, for example, be followed by an alkaline wash to instantly stop the chemical action. With very dilute solutions or low temperatures, more time is required for the same glass removal. The usual result is a larger outlay of apparatus or labor cost without any accompanying convenience or improved results.

We claim:

1. In the method of forming a glass sheet by depositing molten glass on a bath of molten tin or an alloy of tin to form a sheet of glass supported on the surface of said bath, and removing from the surface of said bath a sheet of glass that exhibits iridescence upon heating or upon heating and bending, the improvement comprising removing in the absence of an abrasive, at least a portion of the surface of the glass that was in contact with said bath without substantially changing the thickness of the glass.

2. The process of claim 1 wherein the portion of said surface is removed by subjecting said surface to an aqueous solution of an acid containing a fluoride ion.

3. The process of claim 2 wherein said aqueous solution contains from about 1 to about 30 percent by weight hydrogen fluoride.

4. The process of claim 2 wherein said aqueous solution contains a mixture of hydrofluoric and fluorosilicic acids.

5. The process of claim 4 wherein said aqueous solution contains from about 5 to about 15 percent by weight hydrogen fluoride and from about 1 to about 25 percent by weight fluorosilicic acid.

References Cited by the Examiner

UNITED STATES PATENTS

| 2,989,384 | 6/1961 | Allen et al. | 156—24 |
| 3,023,139 | 2/1962 | Van Tetterode | 156—27 |
| 3,083,551 | 4/1963 | Pilkington | 65—65 |

FOREIGN PATENTS 878,594   10/1961   Great Britain.

DONALL H. SYLVESTER, *Primary Examiner.*

G. R. MYERS, *Assistant Examiner.*

UNITED STATES PATENT OFFICE
CERTIFICATE OF CORRECTION

Patent No. 3,284,181                                                  November 8, 1966

William C. Harrell et al.

It is hereby certified that error appears in the above numbered patent requiring correction and that the said Letters Patent should read as corrected below.

Column 5, line 35, after "weight" strike out the comma and insert -- from day-to-day or at least hour-to-hour, and --; column 7, line 10, for "addresed" read -- addressed --.

Signed and sealed this 30th day of July 1968.

(SEAL)
Attest:

Edward M. Fletcher, Jr.                                    EDWARD J. BRENNER

Attesting Officer                                                  Commissioner of Patents